Nov. 18, 1958 M. A. LERMAN 2,860,523
STEERING HANDLE FOR MOTOR VEHICLES
Filed Feb. 23, 1955

INVENTOR
MONROE ARNOLD LERMAN.
BY
ATTORNEY

United States Patent Office 2,860,523
Patented Nov. 18, 1958

2,860,523

STEERING HANDLE FOR MOTOR VEHICLES

Monroe Arnold Lerman, Sunnyside, N. Y.

Application February 23, 1955, Serial No. 489,918

1 Claim. (Cl. 74—494)

This invention relates to a steering handle for motor vehicles.

The invention applies mainly but not exclusively to handicapped persons who would find it difficult and perhaps impossible to steer a motor vehicle by means of a conventional steering wheel. In a conventional motor vehicle, such as an automobile, the steering or turning ratio of the front wheels of the vehicle to the steering wheel thereof requires that the steering wheel be turned several complete revolutions between the two extreme positions of the front wheels. Thus, a U-turn would require more than two complete revolutions of the steering wheel if the automobile is to be turned around in the shortest turning radius of which it is capable. Many handicapped drivers would find this to be beyond their physical capabilities. Sharp turns to avoid collisions and the other normal hazards of highway travel would also be found difficult if not impossible in the case of many handicapped drivers using conventional steering equipment.

The principal object of this invention is the provision of a steering handle and leverage means between said handle and the steering gear of a conventional motor vehicle whereby said motor vehicle may be steered in either direction by simply actuating said handle within a range of relatively few degrees. The handle is pivotally mounted on the steering column of the motor vehicle. It is connected by means of a pair of lever arms and a cable to a drum mounted on the steering shaft within said steering column. The leverage arms provide the leverage advantage of the mechanism. As the handle is pivoted in one direction, the cable causes the drum and the steering shaft to rotate in the same direction. When the handle is pivoted in the opposite direction, the drum and steering shaft are thereby rotated in the opposite direction.

An important feature of this invention is that the steering mechanism herein described and claimed does not conflict in any way with the operation of the conventional steering apparatus of the motor vehicle in which it is installed. The steering mechanism comprising the present invention simply supplements the conventional steering apparatus and is not intended to take its place, although this might be done, if desired. The same motor vehicle might be used both by a handicapped person and by a non-handicapped person without adjustment or modification of any kind.

It is not intended that the steering mechanism herein described and claimed be used solely by handicapped drivers. A non-handicapped driver would find it equally convenient to use as a supplement to the conventional steering apparatus, but this statement should not be taken as excluding the use of the present invention as the principal or sole steering apparatus of a motor vehicle. The steering handle herein claimed, as connected to the steering shaft in the manner herein described and shown, requires but slight angular movement to steer the motor vehicle. While this feature might constitute an indispensable requirement for many handicapped drivers, it would be extremely useful and handy to a normal driver without actually being indispensable to him.

It is a general rule that the greater movement of a lever arm at the force receiving end, the greater is the force which the lever arm exerts at its opposite end and the smaller is the traveling distance of said opposite end. Conversely, the shorter the stroke at the force-receiving end, the greater is the movement and the smaller is the force exerted at the opposite end. The invention takes this general rule into account by requiring the use of conventional power steering between the steering shaft and the steering wheels. The handle of the present invention is intended to be used not so much for the purpose of utilizing the strength in the driver's arms to steer the motor vehicle but rather for the purpose of enabling the driver to control and actuate the power steering apparatus. This is extremely desirable in the case of handicapped persons who are unable to exert a sufficient force upon non-powered steering apparatus to actuate the same. By the same token, the use of the steering mechanism herein claimed in combination with power steering apparatus, renders it possible to effect a full turning movement of the vehicle by simply moving the steering handle of the present invention within a range of but a few degrees. Thus, although the range of movement at the force receiving end of said steering handle is relatively small, there is no loss of power at the operating end of said handle and coupled with said mechanical advantage through the power steering apparatus is the wide range of movement of the steering shaft.

The invention is illustrated in the accompanying drawing in which.

Figure 1:
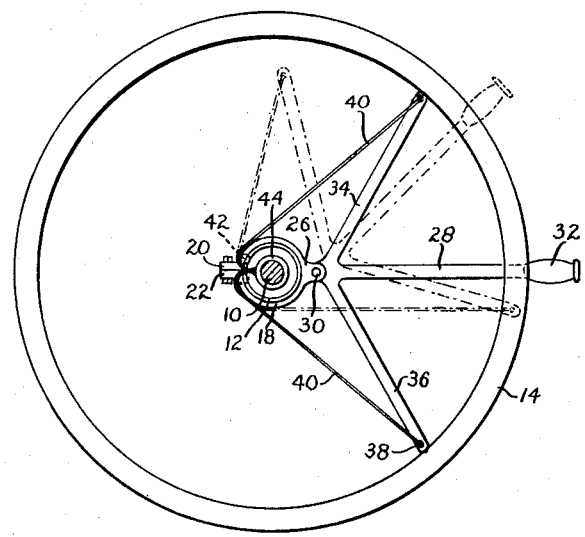
Fig. 1 is a transverse section through shaft of a motor vehicle, showing in plan view the steering mechanism herein claimed.
Figure 2:
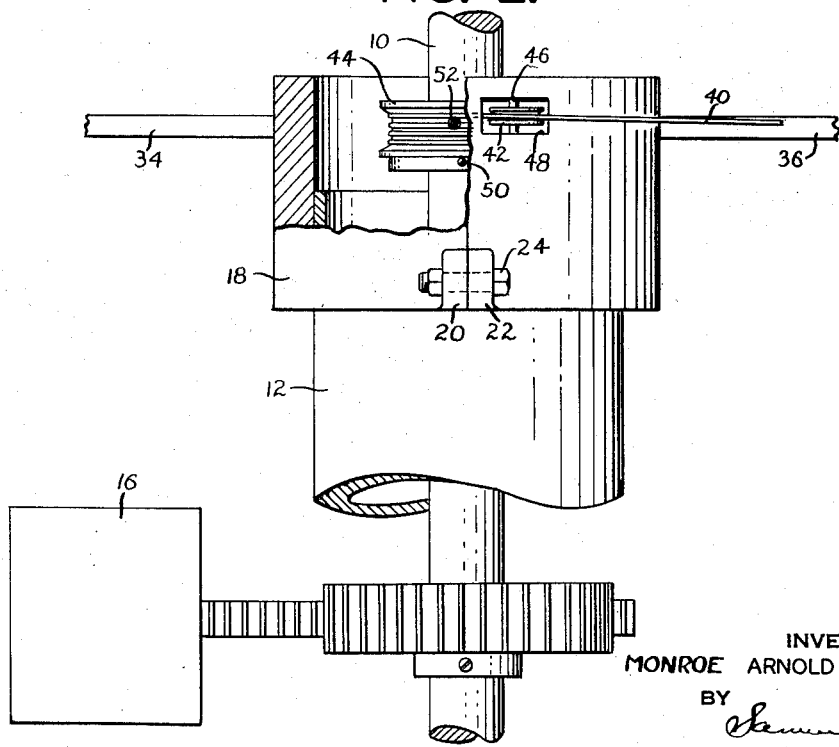
Fig. 2 is an enlarged fragmentary view partly broken away and in section, showing a conventional power operated steering shaft and the steering mechanism herein claimed connected thereto.

Referring now to the drawing, shaft 10 constitutes the steering shaft of a conventional motor vehicle such as an automobile and enclosing said shaft is tubular steering column 12. The steering shaft is connected in conventional manner to the steering gear of the vehicle and at the upper end of said shaft is the steering wheel 14. Also connected to the steering shaft 10 is a conventional power steering mechanism 16 which is illustrated schematically in the drawing. Thus far the mechanism is conventional.

Clamped to steering column 12 is a collar 18 and it will be noted that this collar is split and is provided with flanges 20 and 22 and bolts 24 connecting said flanges and thereby clamping said collar to said column. Collar 18 is provided with a pair of gears 26 and mounted between said gears is the inner end of steering handle 28 herein claimed. A pin 30 pivotally secures said inner end of handle 28 to said gears 26. It will be noted that pin 30 parallels the steering shaft 10. Consequently, the pivotal axis of handle 28 parallels the longitudinal axis of shaft 10.

Handle 28 is provided at its outer end with a rubber grip 32 or the like so that it may comfortably be held in the hand and actuated without danger of the hand slipping off at a critical moment. Handle 28 is also provided with a pair of laterally extending arms 34 and 36 respectively which are joined to handle 28 adjacent pin 30. In the preferred form of this invention, these arms 34 and 36 are situated at angles of less than 90 degrees with respect to the main body of handle 32. In other words, these arms are inclined, slightly, toward handle 28 and more particularly toward its outer end at which hand grip 32 is situated. In overall design, this handle, together with its inclined, laterally extending arms, resembles a boat anchor.

Holes 38 are provided at the ends of arms 34 and 36 to receive the ends of a steering cable 40. The ends of said cable may be secured to the ends of said arms by any suitable and conventional means but one way is to draw them through holes 38 and impress a plug upon them which would be too large to fit through the holes. The cable itself, intermediate its said ends, extends around pulleys 42 and is wound around a drum 44. It will be observed that pulleys 42 are mounted on pins 46 which are supported on collar 18, and more particularly, in openings 48 formed in said collar. These pulleys are freely rotatable and they serve simply as guide pulleys for cable 40 to guide said cable to the drum 44.

Drum 44 is fixedly secured to steering shaft 10 so that it will rotate integrally therewith. Said drum may be secured to said shaft by means of a set screw 50 or by any other suitable means, such as a key and keyway of conventional design. In the preferred form of this invention, cable 40 is looped a number of times around drum 44 and the centermost loop or convolution is curled around a radially extending pin 52 to prevent any possibility of slippage between said cable and said drum.

The mechanism thus described operates as follows: Grip 32 is held in the driver's hand and handle 28 is moved in one direction about pivot 30, say, in counter-clockwise direction as viewed in Fig. 1 to its interrupted line position. This causes arm 36 to draw upon cable 40 and arm 34 to release some of said cable. The reason for this is the offset position of pivot 30 with respect to the axis of rotation of drum 44 and shaft 10. This movement of the cable causes the drum to engage in angular movement and since the drum is fixed to the steering shaft 10, said shaft will likewise engage in angular movement.

This action steers the motor vehicle in precisely the same manner as the motor vehicle would be steered by the turning of steering wheel 14. It would be possible to steer the vehicle by means of the mechanism shown in the drawing, either by turning the steering wheel or by actuating handle 28. It should be remembered that a power mechanism 16 is connected to the steering shaft 10 in conventional manner. Consequently, the manual effort required to actuate handle 28 and through it to actuate the steering gear of the vehicle need not be of a substantial nature since it is magnified or multiplied through the power mechanism.

The foregoing illustrates a preferred form of this invention and it will be understood that this preferred form may be modified and other forms may be provided within the broad spirit of the invention and the broad scope of the claim.

The use of the mechanism herein described and claimed has above been indicated but it should here be understood that both the steering wheel and the steering handle may be used at the same time, one being held in one hand and the other in the other hand. It will further be understood that the steering handle may be mounted either on the right side or on the left side of the steering column, depending upon whether the driver, especially if he be handicapped, is able to use one or the other hand more advantageously.

I claim:

A steering mechanism for motor vehicles, comprising steering gear, a steering shaft actuating said steering gear, a power steering mechanism operatively connected to the steering shaft, a steering wheel connected to the top of said steering shaft, a drum secured to said steering shaft coaxially therewith adjacent said steering wheel, a collar mounted on said steering column and enclosing said drum, a pair of openings formed in said collar and a pair of pulleys rotatably supported by said collar at said openings, a bracket mounted on said collar and projecting radially outwardly therefrom, a handle pivotally mounted at one end on said bracket, the pivotal axis being parallel to the steering shaft axis and the handle extending radially outwardly from said pivotal axis in the direction of the steering wheel rim, the opposite end of said handle projecting outwardly beyond said steering wheel rim, a pair of laterally extending arms connected to said handle on opposite sides thereof and adjacent the pivotal connection between said handle and said bracket, the outer ends of said arms extending to points adjacent the rim of the steering wheel, and a cable wound intermediate its ends around said drum, the ends of said cable extending around said pulleys and through said openings in the collar and being connected to the outer ends of said arms, whereby pivotal movement of the handle about its said pivotal axis, caused by engaging the outer end of said handle and swinging it in either clockwise or counter-clockwise direction, causes the cable to turn the drum and the steering shaft and thereby to operate the steering gear of the vehicle, said pivotal axis being located a sufficient distance from the steering shaft axis and the drum being of such diameter as to provide a mechanical advantage in the handle such that the angular movement of the handle is exceeded by the angular movement of the steering shaft, whereby it is possible to steer the vehicle by moving the handle relatively small angular distances.

References Cited in the file of this patent

UNITED STATES PATENTS

| | | |
|---|---|---|
| 149,211 | Foot et al. | Mar. 31, 1874 |
| 570,680 | Perley | Nov. 3, 1896 |
| 576,683 | MacHoffie et al. | Feb. 9, 1897 |
| 1,209,335 | Richardson | Dec. 19, 1916 |
| 1,220,104 | Hanten | Mar. 20, 1917 |
| 1,257,601 | Haley | Feb. 26, 1918 |
| 1,777,189 | Williams | Sept. 30, 1930 |
| 2,255,274 | Schoenberg | Sept. 9, 1941 |

FOREIGN PATENTS

| | | |
|---|---|---|
| 15,452 of 1895 | Great Britain | June 27, 1896 |
| 372,448 | France | Feb. 19, 1907 |